No. 12,299.

REISSUED JAN. 3, 1905.

T. M. DILS.

HOT AIR REGISTER.

APPLICATION FILED SEPT. 10, 1900.

2 SHEETS—SHEET 1.

Witnesses,
Edward G. Allen.
Adolf C. Kaiser

Inventor,
Thomas M. Dils,
by Crosby Gregory.
Attys.

No. 12,299. REISSUED JAN. 3, 1905.

T. M. DILS.

HOT AIR REGISTER.

APPLICATION FILED SEPT. 10, 1900.

2 SHEETS—SHEET 2.

Witnesses,
Edward G. Allen.
Adolf C. Kaiser.

Inventor,
Thomas M. Dils,
by Crosby & Gregory.
Atty's.

No. 12,299. Reissued January 3, 1905.

UNITED STATES PATENT OFFICE.

THOMAS MOORE DILS, OF DAVENPORT, IOWA, ASSIGNOR TO THOMAS J. DRUMMOND, OF BOSTON, MASSACHUSETTS.

HOT-AIR REGISTER.

SPECIFICATION forming part of Reissued Letters Patent No. 12,299, dated January 3, 1905.

Original No. 622,330, dated April 4, 1899. Application for reissue filed September 10, 1900. Serial No. 29,546.

*To all whom it may concern:*

Be it known that I, THOMAS MOORE DILS, a citizen of the United States, residing at Davenport, in the county of Scott and State of Iowa, have invented a Hot-Air Register, of which the following is a specification.

My invention relates to hot-air registers.

The object of the invention is to provide a register which when closed will present practically a smooth surface, and thereby prevent the sweepings from entering and lodging and accumulating within the hot-air pipe of the furnace; furthermore, to provide means by which the valves may be easily opened and closed, and, finally, to provide a register which shall be simple of construction, durable in use, and comparatively inexpensive of production.

With these objects in view the invention consists in certain features of construction and combination of parts, which will be hereinafter fully described and claimed.

Figure 1:
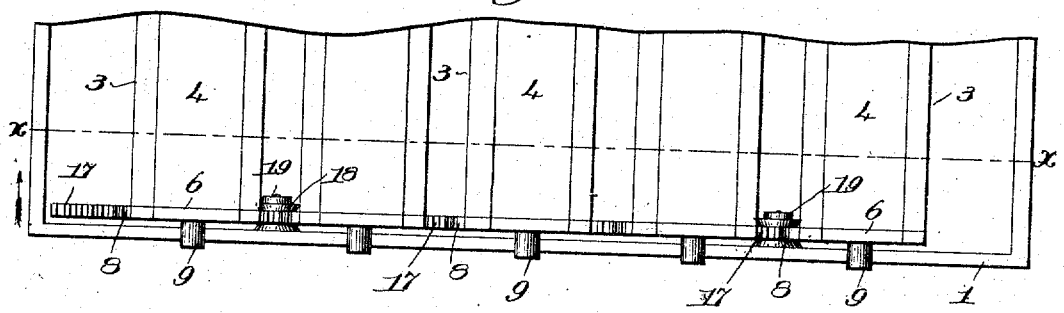
Figure 2:
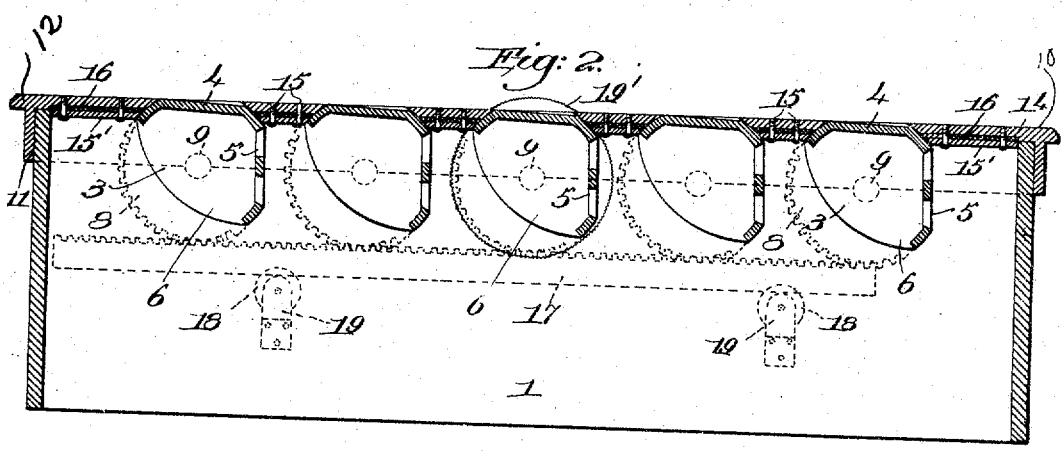
Figure 3:
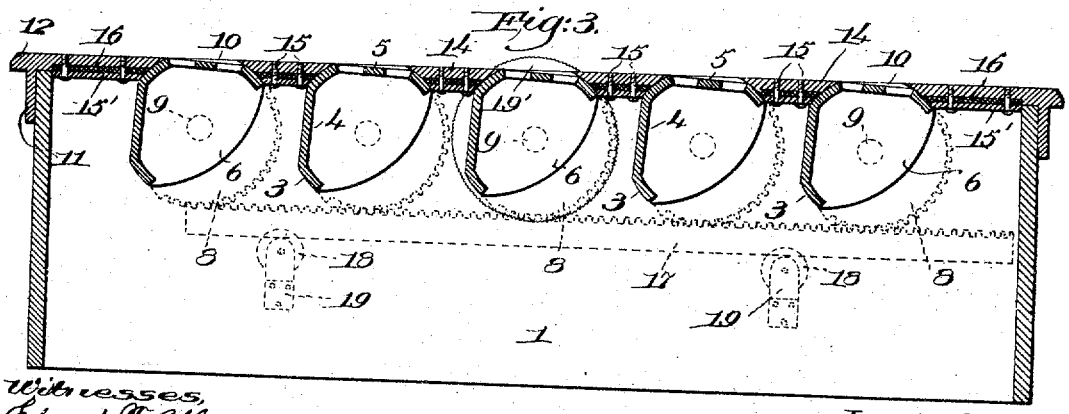
Figure 4:
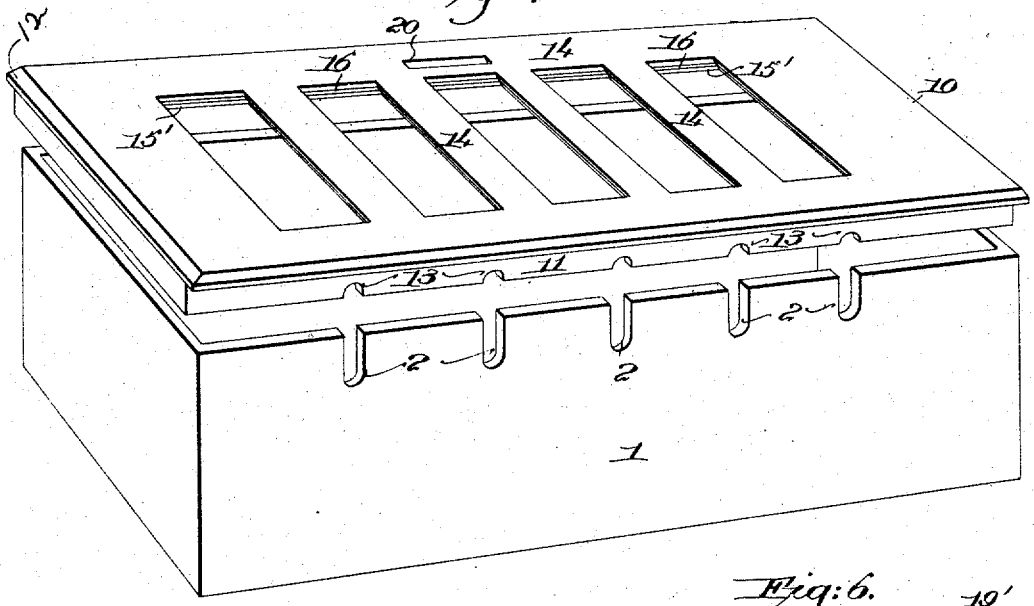
Figure 6:
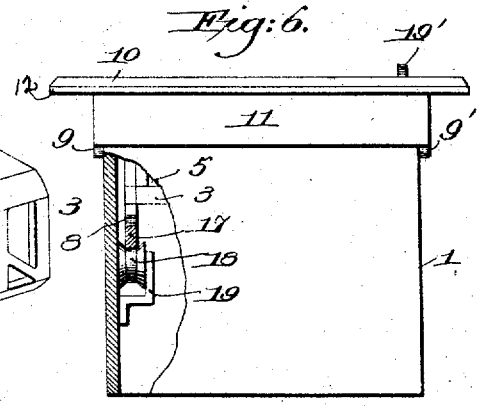
Figure 5:
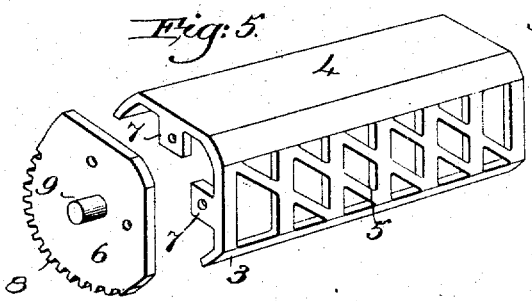
Figure 7:
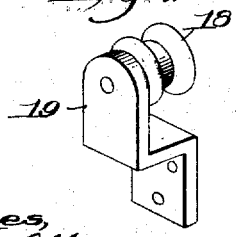
Figure 8:
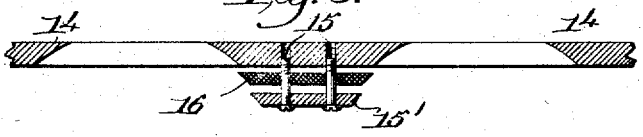

In the accompanying drawings, Figure 1 is a plan view of a fragment of the register box or frame, the valves being shown in position therein with the solid face uppermost, the top being removed. Fig. 2 is a longitudinal sectional view on line *x x* of Fig. 1 looking in the direction of the arrow, showing the surface plate in place and indicating in dotted lines the operating connections which would be seen by looking in a direction opposite to said arrow. Fig. 3 is a similar view, the valves being shown open. Fig. 4 is a detail perspective view of the register-box and the surface plate, the parts being separated. Fig. 5 is a similar view of one of the valves, its head being shown separated from the end. Fig. 6 is an end view, the front of the register-box being broken away to more clearly illustrate the rack-bar and its connection with the segmental racks of the valve-heads. Fig. 7 is a detail perspective view of one of the roller-bearings and its bracket, and Fig. 8 is an enlarged sectional view of the surface plate and valve-packing and its coacting elements.

In said drawings, 1 denotes the bottomless register box, frame, or casing, the sides of which are provided at their upper edges with alined slots 2.

3 denotes valves which consist of a solid face 4 and an open-work face 5. In cross-section these valves are angular. 6 denotes detachable heads for said valves, which are secured to integral lugs 7, projecting from the sides of said valves, and are provided with segmental racks 8 and with trunnions 9. These trunnions 9 are slipped into the slots 2, and a surface plate 10, consisting of a vertical flange 11 and a horizontal flange 12, is applied to the upper end of the box and has its vertical flange 11 provided with semicircular recesses 13, that fit over the trunnions 9 of the valve-heads, so as to permit of a free rotary movement of the valves. The surface plate is formed with integral transverse bars 14, to the under side of which are clamped asbestos packing-strips 16, which are removably secured in place by means of backing-plates 15′ and screws 15, the free ends of said packing-strips extending into the path of the valves. This packing is designed to form an air-tight joint between the edges of the solid portions of the valve and the edges of the bar when the register is closed, and thereby prevent the escape of hot air through said register as well as prevent dust and sweepings falling through into the hot-air pipe.

17 denotes a rack-bar, the lower smooth edge of which is supported on rollers 18, journaled to brackets 19, secured to one of the sides of the casing. This rack-bar meshes with the segmental racks 6 of the heads.

19′ denotes a foot-wheel connected with one of the trunnions and projecting upward through a slot 20 in the surface plate for a sufficient distance to enable the foot of a person to engage said wheel and rotate it. The rotation of this wheel will turn the valves to present either their open or closed sides to thus open or close the register, according to the direction of movement of said wheel, as the movement of the valve to which said wheel is secured will be transmitted to the remaining valves through the rack-bar and segmental racks attached to each valve.

From the foregoing description, taken in connection with the accompanying drawings, the construction, operation, and advantages of my invention will be readily understood without requiring an extended explanation.

It will be seen by reference to the drawings that when the register is closed a practically smooth surface is presented, thereby enabling the furniture in the room to be moved from one place to another without danger of breaking the grating, which is a serious drawback to the registers now in use. Furthermore, owing to the closed joints formed between the solid portions of the valve and the bars of the surface plate no sweepings can possibly lodge and accumulate within the hot-air pipe.

Having fully described my invention, what I claim, and desire to secure by Letters Patent, is—

The combination with a register-box, of valves journaled in said box and formed with solid and open-work faces, a surface plate secured to said box and formed with the spaced transverse bars 14, the backing-plates 15′ removably secured to the under side of said bars and the packing-strips 16 clamped between said bars and plates and having their free edges projecting into the path of said valves.

THOMAS MOORE DILS.

Witnesses:
L. M. FISHER,
JOHN HEINZ.